United States Patent

[11] 3,628,973

| [72] | Inventors | Nathan R. Greening<br>Glenview;<br>Llewellyn E. Copeland, Des Plaines; George J. Verbeck, Deerfield, all of Ill. |
|---|---|---|
| [21] | Appl. No. | 91,518 |
| [22] | Filed | Nov. 20, 1970 |
| [45] | Patented | Dec. 21, 1971 |
| [73] | Assignee | Portland Cement Association<br>Skokie, Ill.<br>Continuation-in-part of application Ser. No. 735,963, June 11, 1968, now abandoned. This application Nov. 20, 1970, Ser. No. 91,518 |

[54] MODIFIED PORTLAND CEMENT AND PROCESS
12 Claims, No Drawings

[52] U.S. Cl.................................................. 106/89,
106/97, 106/100, 106/102, 106/315
[51] Int. Cl.......................................................... C04b 7/54,
C04b 13/22
[50] Field of Search............................................. 106/89, 97,
100, 102, 315

[56] References Cited
UNITED STATES PATENTS

| 3,017,246 | 1/1962 | Kamlet | 106/100 |
| 2,859,124 | 11/1958 | King | 106/104 |
| 2,390,138 | 12/1945 | Vallandigham | 106/315 |
| 1,904,640 | 4/1933 | Windecker | 106/100 |
| 1,677,182 | 7/1928 | Hasselbach | 106/104 |
| 1,219,315 | 3/1917 | Huber et al. | 106/100 |
| 1,186,522 | 6/1916 | Ellis | 106/100 |
| 417,634 | 3/1889 | Duryee | 106/100 |

OTHER REFERENCES

Jeevaratnam et al. Journal of the American Ceramic Society, Vol. 47, No. 2, 105- 106 (1964)
Lea and Desch, " The Chemistry of Cement and Concrete," Edw. Arnold & Sons, pgs. 78, 122 & 149 (1956).

*Primary Examiner*—Tobias E. Levow
*Assistant Examiner*—W. T. Scott
*Attorney*—Pendleton, Neuman, Williams & Anderson ABSTRACT: A modified Portland cement having a high early set strength containing one to thirty percent $11CaO \cdot 7Al_2O_3 \cdot CaX_2$ where X is a halogen.

MODIFIED PORTLAND CEMENT AND PROCESS

This application is a continuation-in-part of our prior application Ser. No. 735,963 filed June 11, 1968 and now abandoned.

This invention relates to modified portland cement compositions and processes for making same.

A characteristic of portland cements is that after mixing with water they set to a final product having very considerable strength. However, one of the properties of such compositions is that early set strength development is slow when compared to certain other cementitious products and the initial set strength increases only comparatively slowly during the setting period. This property has limited the uses to which portland cement can be put in certain applications.

The relatively slow setting properties of presently used portland cement and portland cement concretes make the forming, casting and form-stripping cycle on job-placed concrete a process requiring at least one and usually several days. A portland cement in which the set can be controlled would speed up the building process. There is also a great need for fast setting concrete in concrete products plants making such products as block, pipe, architectural panels, structural beams and columns, extruded products and various types of sculptured concrete. If, for example, in such a plant the fast set would permit the turnover of molds three to four times per day instead of once a day, this would decrease a major part of the capital investment three to four times. In certain special uses, such as patching airport pavements, it is desirable to have a portland cement concrete that can be poured, screeded, and set adequately for traffic in less times than are now possible. Lightweight concrete for roof decks, when pumped from ground to roof level, desirably should set in 20 to 30 minutes to permit working on the roof behind the pouring operation. In most of these instances, the fast setting and curing of concrete will eliminate many of the difficulties attendant to slow setting concrete. In many cases, this will minimize or eliminate the need for extended moist-curing times, covering of the concrete to retain the moisture, sprinkling, etc.

Accordingly, a further object of this invention is the provision of a portland cement composition which will have a short but controllable initial set time.

A further object of this invention is the provision of a modified portland cement which upon hydration will develop a high early set strength.

A further object of this invention is to provide a process for preparing a modified portland cement having the characteristics above indicated.

Further and additional objects of this invention will appear from the following description and the appended claims.

In accordance with one embodiment of this invention, a modified portland cement is provided which contains as one ingredient a substantial amount of a ternary compound which is essentially a calcium halo-aluminate having the chemical formula $11CaO \cdot 7Al_2O_3 \cdot CaX_2$ wherein X is a halogen, i.e., fluorine, chlorine, bromine or iodine. The ternary calcium halo-aluminates having the above-indicated molecular formula are per se known to the art and have been described by Brisi et al., *Annoli di Chimica*, 56, 224 (1966) and by Jeevaratnam et al., *Jour. Amer. Ceram. Soc.*, 17, 105 (1964). It has now been discovered that if between about 1 and 30 percent by weight of the ternary compound is contained in a conventional portland cement, the cement will develop a high early set strength. The preferred ternary calcium halo-aluminate to be incorporated into the cement in accordance with this invention is calcium fluoro-aluminate having the formula $11CaO \cdot 7Al_2O_3 \cdot CaF_2$. In general the bromo-aluminates and the iodo-aluminates are more expensive than the corresponding fluoro- and chloro-aluminates and may present some problems because of the formation and liberation of toxic bromine or iodine vapors during manufacture of the cement or its components. Also, cements containing the iodo-aluminates, bromo-aluminates and chloro-aluminates may have a tendency to effloresce from the finished set concrete product and may give rise to corrosive problems, particularly with respect to steel reinforced concrete. These noted disadvantages are not inherent in the fluoro compound. Also, mixtures of the several halo-compounds may be employed. For example, in manufacture, sufficient chloride may be used to neutralize the alkali and the balance added may be the fluoride. In this manner the efflorescent and corrosion problems incident to the use of chlorides alone may be avoided.

In accordance with this invention, the calcium halo-aluminate may be incorporated into the cement in any one of several ways. For example, in one method the essentially pure ternary compound may be separately prepared and interground or otherwise thoroughly mixed in finely divided form with the portland cement. A second method involves the preparation by burning in conventional equipment of a hydraulic cement composition having a high alumina content in the presence of a halide, such as calcium fluoride, to produce a cementitious product enriched with the ternary compound and thereafter blending this enriched product with a conventional portland cement in order to provide a final product having the desired concentration of the calcium halo-aluminate. A third method for practicing this invention involves the preparation of the final modified portland cement clinker directly by burning in conventional equipment the cement clinker ingredients in the presence of an appropriate amount of the calcium halide (e.g., calcium fluoride), the initial aluminate content of the clinker ingredients being sufficiently high to permit the formation of the required amount of the compound $11CaO \cdot 7Al_2O_3 \cdot CaX_2$ during the burning operation. Thus, it will be apparent that the aluminate content should be at least about 0.5 percent by weight (calculated as $Al_2O_3$) to enable the formation in the clinker of 1 percent of the ternary compound during burning. In the event the raw mix contains compounds of iron, the minimum amount of aluminate present should be increased by an amount equivalent to 1 mole of $Al_2O_3$ per mole of $Fe_2O_3$ because of the preferential formation of $4CaO \cdot Al_2O_3 \cdot Fe_2O_3$ during burning.

In each of the methods suggested above, the ternary halide compound is formed by burning in the absence of added steam a mixture of a source of alumina, a source of lime and a source of the halide. In order to obtain desired calcium fluoro-aluminate using calcium fluoride in any of the methods above outlined, the burning temperature is suitably in the range of 1,275° C. (2,327° F.) to 1,400° C. (2,552° F.), preferably 1,300° C. (2,372° F.) to 1,350° C. (2,462° F.). In order to obtain the ternary chloro-aluminate, the essentially pure compound $11CaO \cdot 7Al_2O_3 \cdot CaCl_2$ is formed by burning in the temperature range of about 1,225° C. (2,237° F.) to 1,275° C. (2,327° F.), or, in the case of in situ formation of the chloro-aluminate by the second or third methods above noted, a higher burning temperature is usually required i.e., 1,380° C. (2,516° F.) to 1,510° C. (2,750° F.). If the burning temperatures are too low or too high or if added steam is present, other side reactions occur and the desired quantities of the ternary compound are not formed.

The modified portland cement of this invention may be used in a conventional way in applications where a short initial setting time and high early set strength are desired. For example, the cement may be used with conventional aggregates to produce a patching mixture for highways and airplane runways. Such "normal density" compositions will develop an initial set strength in 1 hour to support a compressive force of 500 to 2,500 pounds per square inch. Also, the cement finds utility in mixing with lightweight aggregates, such as pumice, expanded vermiculate or expanded perlite, for the pouring of roof decks in a conventional manner. Employing appropriate formulations, such a low-density composition upon setting will develop a sufficient initial set strength to support a compressive force of 30 to 150 pounds per square inch, thereby supporting the weight of a man, within 30 to 120 minutes after the deck has been poured. Of course, in these compositions the later age strength continues to develop over a period of time in the same manner as one prepared from a comparable portland cement concrete having no ternary additive.

The amount of calcium halo-aluminate contained in the modified portland cement in accordance with this invention is between about 1 and 30 percent and preferably between about 5 and 30 percent by weight. Other conditions remaining the same, higher concentrations result in higher early set strengths. The specific amount to be used in any one instance may depend upon a number of factors such as the concentration of sulfates or other set regulating agents in the final cement product. It is known that sulfates serve to retard the setting time of portland cement compositions and as the concentration of the calcium halo-aluminate is increased, the amount of calcium sulfate required for a particular setting time also should be increased. Ordinarily the sulfate content of the cements of this invention will be between about 1 and 12 percent $SO_3$ in the form of gypsum, anhydrite, hemihydrate or mixture thereof. In commercial operation the sulfate may be incorporated into the product by intergrinding anhydrite and calcium or magnesium carbonate with the burned clinker, the purpose of the carbonate in a high-sulfate cement being to control the initial handling time for the mortar and to promote the continued strength development which is characteristic of normally sulfated portland cements. Other factors affecting setting time include the degree of alkalinity as well as the fineness of the cement and temperature. High alkalinities and increases in fineness and temperature of the cement each have a tendency to shorten the initial set time for the cement compositions.

For a more complete understanding of this invention, reference will now be made to several specific examples for carrying it out. In all of the following examples the high-temperature burning was effected in the indicated conventional equipment at the specified temperatures and in the absence of added steam.

EXAMPLE 1

Five hundred thirty-six parts by weight of commercial calcite (analyzed 97.90 percent by weight $CaCO_3$), 194 grams of commercial kaolin and 15.0 grams of commercial calcium fluoride ($CaF_2$) were interground and then burned at 1,300° C. (2,372° F.) for one-half hour in a muffle furnace. The kaolin employed analyzed as follows (percent by weight):

| | |
|---|---|
| $SiO_2$ | 44.60 |
| $Al_2O_3$ | 39.92 |
| $Fe_2O_3$ | 0.17 |
| $TiO_2$ | 1.45 |
| MgO | <0.01 |
| $SO_3$ | 0.05 |
| $K_2O$ | 0.05 |
| $Na_2O$ | 0.02 |
| $P_2O_5$ | 0.08 |
| Ignition Loss | 13.24 |

The resulting product contained essentially calcium silicate and a calcium fluoro-aluminate having the formula $11CaO \cdot 7Al_2O_3 \cdot CaF_2$. The amount of the ternary fluoro compound as determined by X-ray analysis in the composition was 27.8 percent by weight. The resulting clinker was ground to a fineness of 4,320 cm.$^2$ per gram (Blaine) to form an enriched cement (Composition B200) which analyzed as follows (percent by weight):

| | |
|---|---|
| $SiO_2$ | 18.41 |
| $Al_2O_3$ | 16.34 |
| $Fe_2O_3$ | 0.68 |
| CaO | 63.06 |
| $TiO_2$ | 0.76 |
| MgO | 0.40 |
| $K_2O$ | 0.01 |
| $Na_2O$ | 0.01 |
| F | 1.16 |
| Free CaO | 1.94 |

Forty parts of the enriched product were thoroughly mixed with 60 parts by weight of commercial portland cement (Composition B) having a surface area of 4,223 cm.$^2$ per gram (Blaine), 3.4 parts of anhydrous calcium sulfate and 3.4 parts of calcium sulfate hemihydrate. Composition B analyzed as follows (percent by weight)

| | |
|---|---|
| $SiO_2$ | 20.86 |
| $Al_2O_3$ | 5.48 |
| $Fe_2O_3$ | 2.11 |
| $Mn_2O_3$ | 0.11 |
| CaO | 63.16 |
| MgO | 3.18 |
| $SO_3$ | 2.57 |
| $K_2O$ | 0.04 |
| $Na_2O$ | 0.12 |
| Free CaO | 2.10 |
| Ignition Loss | 2.10 |

The resulting modified portland cement composition contained 10.4 percent by weight of $11CaO \cdot 7Al_2O_3 \cdot CaF_2$, 5.1 percent $SO_3$ and 1.9 percent free lime.

The final cement composition prepared as described above was mixed with expanded perlite, in the ratio of 1 part by volume of cement to 6 parts perlite, gauged with water and entrained air to a density of 49 pounds per cubic foot and poured. After 1 hour the composition had set sufficiently to resist a compressive force of 71 pounds per square inch which is sufficient to support the weight of a workman. By the end of 3 days the composition had set to a strength such that it would support 282 pounds per square inch.

EXAMPLE 2

Ninety one and six-tenths parts by weight of penta calcium trialuminate ($5CaO \cdot 3Al_2O_3$), 2.9 parts of alumina ($Al_2O_3$), and 5.5 parts of fluorite ($CaF_2$) were interground and heated 1½ hours at 1,260° C. (2,300° F.), ground to minus 200 mesh, reburned 1½ hours at 1,260° C., reground to a fineness of 4,200 cm.$^2$ per gram (Blaine), then burned a third time at 1,300° C. (2372° F.). The product contained 91 percent $11CaO \cdot b0Al_2O_3 \cdot CaF_2$ and 9 percent $12CaO \cdot 7Al_2O_3$. The product was ground to a fineness of 5,015 cm.$^2$ per gram (Blaine). To form the enriched cement 14.6 parts by weight of the essentially pure product and 2.4 parts of anhydrite ($CaSO_4$) were thoroughly mixed with 82.9 parts of the same commercial portland cement (Composition B) and used in example 1. The resulting cement composition embodying this invention and prepared as outlined above contained 13.3 percent by weight of $11CaO \cdot 7Al_2O_3 \cdot CaF_2$, 1.3 percent of $12CaO \cdot b0Al_2O_3$, 3.5 percent $SO_3$, and 2.1 percent free lime.

The final modified portland cement composition was mixed, in the volume ratio of 1 part cement to 6 parts perlite (weight ratio of 356 parts cement to 182 parts perlite), gauged with water and entrained air to a density of 54 pounds per cubic foot and poured. After 1 hour the composition had set sufficiently to resist a compressive force of 48 pounds per square inch. At 2 days the composition had set to a strength such that it would support 124 pounds per square inch.

EXAMPLE 3

One hundred parts by weight of a commercial portland cement kiln feed (Composition A), six parts of hydrated alumina (64.9 percent by weight $Al_2O_3$) and 2.0 parts of calcium fluoride were interground and burned in an electric muffle at 1,350° C. (2,462° F.) for 30 minutes. The clinker was ground to a fineness of 4,340 cm.$^2$ per gram (Blaine). The analysis of Composition A and the ground clinker (1204K) were as follows in percent by weight:

| | Composition A | 1204K |
|---|---|---|
| $SiO_2$ | 13.7 | 19.15 |
| $Al_2O_3$ | 4.4 | 11.91 |
| $Fe_2O_3$ | 1.7 | 2.71 |
| CaO | 42.5 | 60.52 |
| MgO | 2.2 | 2.87 |
| $K_2O$ | 0.6 | 0.68 |
| $Na_2O$ | 0.3 | 0.29 |
| F | — | 0.65 |
| Free CaO | — | 1.31 |

Ignition Loss    35.4    0.57

The amount of the ternary fluoro compound as determined by X-ray analysis in the clinker was 19.30 percent by weight. One hundred parts of the ground clinker were mixed with 2.6 parts anhydrite ($CaSO_4$) and 2.6 parts calcium sulfate hemihydrate ($CaSO_4 \cdot \frac{1}{2}H_2O$) to give a cement containing 18.3 percent $11CaO \cdot b0Al_2O_3^2$, 2.8 percent $SO_3$ and 1.25 percent free lime.

The resulting cement was mixed with perlite in the ratio 1 part by volume of clinker to 6 parts of perlite, gauged with water and entrained air to a density of 49 pounds per cubic foot, and poured. After 1 hour the composition had set sufficiently to resist a compressive force of 88 pounds per square inch. By the end of 2 days the concrete had developed strength to resist a compressive force of 130 pounds per square inch.

EXAMPLE 4

Five hundred thirty-seven parts by weight of commercial calcite ($CaCO_3$), 198 parts of commercial kaolin (see example 1 for analysis) and 17.5 parts of anhydrous calcium chloride ($CaCl_2$) were interground and burned at 1,440° C. (2,624° F.) for 40 minutes in a gas fired furnace. The resulting product contained essentially calcium silicate and calcium chloroaluminate having the formula $11CaO \cdot 7Al_2O_3 \cdot CaCl_2$. The amount of the ternary chloro compound as determined by X-ray analysis in the resulting clinker was 24.6 percent by weight; the analysis of the clinker (B221J) was as follows (percent by weight):

| | |
|---|---|
| $SiO_2$ | 19.40 |
| $Al_2O_3$ | 16.07 |
| $Fe_2O_3$ | 0.30 |
| CaO | 61.68 |
| $TiO_2$ | 0.79 |
| MgO | 0.38 |
| $K_2O$ | <0.01 |
| $Na_2O$ | <0.01 |
| Cl | 1.24 |
| Free CaO | 0.16 |

The clinker was ground to a fineness of 4018 Blaine to form the enriched cement and 35 parts by weight were thoroughly mixed with 65 parts of commercial portland cement (Composition B of example 1). The resulting modified portland cement composition embodying this invention and prepared as outlined above contained 8.6 percent $11CaO \cdot 7Al_2O_3 \cdot CaCl_2$, 1.67 percent $SO_3$ and 1.4 percent free lime.

The final cement composition was mixed with expanded perlite, in the ratio of 1 part by volume of cement to 6 parts perlite, gauged with water and entrained air to a density of 51 pounds per cubic foot and poured. After 2 hours the concrete had set sufficiently to resist a compressive force of 62 pounds per square inch. By the end of 3 days the concrete had developed strength to resist a compressive force of 232 pounds per square inch.

EXAMPLE 5

One hundred parts by weight of a commercial portland cement kiln feed (Composition A of example 3), 6 parts of hydrated alumina (64.9 percent by weight $Al_2O_3$) and 2.32 parts of anhydrous calcium chloride were interground and burned in an electric muffle at 1,440° C. (2,624° F.) for 35 minutes. The resulting clinker was ground to a fineness of 4038 Blaine. The analysis of the resulting clinker (I220C) in weight percent was as follows:

| | |
|---|---|
| $SiO_2$ | 19.72 |
| $Al_2O_3$ | 11.88 |
| $Fe_2O_3$ | 2.58 |
| CaO | 61.45 |
| MgO | 2.89 |
| $K_2O$ | 0.02 |
| $Na_2O$ | 0.02 |
| Cl | 0.85 |
| Free CaO | 0.36 |

The amount of the ternary chloro compound as determined by X-ray analysis in the clinker was 14.8 percent by weight.

The ground clinker was mixed with perlite in the ratio 1 part by volume of clinker to 6 parts of perlite, gauged with water and entrained air to a density of 49 pounds per cubic foot and poured. After 2 hours the composition had set sufficiently to resist a compressive force of 86 pounds per square inch. By the end of 3 days the concrete had developed strength to resist a compressive force of 288 pounds per square inch.

The 28 day strengths of the lightweight perlite concretes (3-day-moist cure, subsequent 25-day-dry cure) described in examples 1 to 5 above averaged about 450 pounds per square inch. The expanded perlite used in those examples conformed to ASTM designation: C332–66.

EXAMPLE 6

The process of example 5 is carried out by substituting calcium bromide for the calcium chloride. The resulting cement has a reduced set time when compared with a similar composition having no $11CaO \cdot 7Al_2O_3 \cdot CaBr_2$ or other halo-aluminate present. Care is taken in the burning step because the fumes of elemental bromine formed may provide a health hazard.

EXAMPLE 7

An enriched cement was prepared by mixing 89.6 parts of the compound B200 (example 1), 89.6 parts of a commercial portland clinker C, 16 parts anhydrite (anhydrous $CaSO_4$) and 4.8 parts of dehydrated plaster (approx. $CaSO_4 \cdot 1/10\ H_2O$). The portland clinker C was ground to 3,685 cm.$^2$/g. (Blaine) and analyzed as follows (percent by weight):

| | |
|---|---|
| $SiO_2$ | 21.82 |
| $Al_2O_3$ | 6.02 |
| $Fe_2O_3$ | 2.36 |
| CaO | 64.59 |
| MgO | 3.36 |
| SO | 0.22 |
| $K_2O$ | 0.42 |
| $Na_2O$ | 0.19 |
| Free CaO | 0.87 |
| Ignition Loss | 0.67 |

A normal density mortar was prepared from the enriched cement, the ingredients of which were:

| | |
|---|---|
| Enriched cement | 251 grams |
| Water | 105 grams |
| Sand (Elgin, Ill.) | 502 grams |

These ingredients were mixed 2 minutes and 2 inch cubes were cast for compressive strength determinations. The handling time for the mortar was 14 minutes; the compressive strength at 1 hour was, 1,000 p.s.i. and at 1 day was 3,300 p.s.i.

EXAMPLE 8

A concrete mixture was prepared from the enriched cement previously described in example 7. The ingredients of the concrete were:

| | |
|---|---|
| Enriched cement | 7.27 lbs. |
| Water—(net) | 3.17 lbs. |
| Sand (Elgin, Ill.) | 16.3 lbs. |
| Gravel (Eau Claire, Wis.) | 23.1 lbs. |
| (¾-inch maximum size) | |

These ingredients were mixed for 2 minutes and 3×6-inch cylinders cast for compressive strength determinations. The concrete consistency was approximately 2½ inches (slump) and the mixture remained workable for approximately 13 minutes. The average compressive strength of three cylinders tested at 1 hour after start of mixing was 607 pounds per square inch and 1,560 pounds per square inch at 24 hours.

As previously suggested, the initial set time (i.e., handling time) of mortars prepared from the modified portland cement of this invention may be controlled by the addition of calcium sulfate, the amount used being dependent upon the percentage of calcium halo-aluminate in the cement and the handling time desired. As described in the previous examples, such addition may be effected by blending the ground clinker with the calcium sulfate in the form of the anhydrite, hemihydrate or dihydrate. In commercial operations this requires the use of special blending equipment which is expensive and not a normal complement of a conventional portland cement plant. It has now been found that the calcium sulfate may usefully be added to the modified cement clinker by intergrinding anhydrite directly with the clinker formed by the process of this invention. Use of the anhydrite instead of gypsum prevents the undesired liberation of water into the clinker during grinding and accompanying premature hydration of the cement. Also when anhydrite is used it has been found to be advantageous to intergrind calcium or magnesium carbonate with it. The carbonate, which may be in the form of inexpensive limestone or dolomitic limestone, further assists in providing a cement having an improved early set strength with good strength development to the desired end strength. When both anhydrite and limestone (e.g., calcium carbonate) are interground with the clinker, best results are obtained when the resulting modified portland cement has a molar ratio of sulfate (calculated as $SO_3$) to alumina (calculated as $Al_2O_3$) between about 0.6 and 1.0 and a molar ratio of calcium or magnesium carbonate (calculated as $CO_2$) to alumina (calculated as $Al_2O_3$) between about 0.3 and 1.4.

EXAMPLE 9

To illustrate the intergrinding feature of this invention, a burned clinker[MCC160] prepared essentially by the process of example 3 having an $Al_2O_3$ content of 11.65 percent by weight and a ternary fluoro compound content of about 20 percent by weight was interground with calcium sulfate and limestone in the proportions of 100 parts by weight of clinker, 10.72 parts by weight of anhydrite and 4.5 parts by weight of limestone [$SO_3$ to $Al_2O_3$ molar ratio = 0.70; $CO_2$ to $Al_2O_3$ molar ratio = 0.38]. The product [XBL 241] was interground to a fineness of 4,601 cm.$^2$ per gram (Blaine).

A conventional ASTM C-109 mortar was prepared from the finished cement with a water-to-cement ratio of 0.51. The mortar had a handling time of 15 minutes. The compressive strength at 1 hour was 775 pounds per square inch, at 3 hours was 975 pounds per square inch and after 25 days was 5,525 pounds per square inch.

With respect to the percentage of the ternary halo-aluminate, $11CaO \cdot 7Al_2O_3 \cdot CaX_2$ that may be present in the modified portland cement of this invention, this will depend upon the early set strength desired and the amount of set retarder, i.e., calcium sulfate, used to control the initial set time. Generally speaking, the amount of the ternary compound, or a mixture of the several halo ternary compounds, should be in excess of 1 percent by weight, and preferably in excess of 5 percent by weight of the portland cement to obtain significant results. Economic considerations dictate that under ordinary conditions of use the percentage should not exceed about 30 percent by weight.

In the foregoing examples, X-ray analyses on the interburned cement and the blending cements were used to determine the identity and amount of halo-aluminate. The method is essentially described by Copeland et al., *Analytical Chemistry* 30, 196 (1958) and was essentially as follows:

Silicon was employed as the internal standard, the 111 line ($d$=3.14 A.) being used. One of the two strongest lines of the halo-aluminates, $d$=4.88 A., was chosen as the analytical line for the aluminates. The intensities of the lines were measured by planimetering their areas.

The halo-aluminates have X-ray diffraction patterns that are not only almost identical to each other but also to that of pure $12CaO \cdot 7Al_2O_3$ and all have lines at $d$=3.20 A. These lines overlap the 3.14 A. line of silicon to a slight degree. Instead of graphically correcting for this overlap, the combined intensities of these two lines (the area under the double hump) were measured, and the ratio of this combined intensity to the intensity of the 4.88 A. line was calculated for various mixtures (several for each of three compounds) that contained different proportions of silicon. The graphs of intensity ratio versus the weight of silicon to halo-aluminate and also to pure $12CaO \cdot b0Al_2O_3$, were linear, each having a positive intercept, $\alpha$, on the axis of intensity ratios and a positive slope, $\beta$. In each case the intercept is equal to the ratio of the intensity of the 3.20 A. line of the particular aluminate to that of its 4.88 A. line. These intercepts differ from each other and can be used to identify the particular compound present.

The detailed method of sample analysis follows.

1. If it is not known which halo-aluminate is present, determine the intensity ratio of the 3.2 A. line to that of 4.88 A. line. This ratio, $\alpha$, by reference to that table below, identifies the halo-aluminate.
2. Intergrind a known quantity of silicon with the sample. Ten percent Si is usually suitable. Determine the combined intensity of the 3.20 A. and 3.14 A. lines. Also determine the intensity of the 4.88 A. line of the halo-aluminate.
3. Calculate an intensity ratio, R, by dividing the combined intensity of the 3.20 A. and 3.14 A. lines by that of the 4.88 A. line. The intensity ratio so obtained is used to calculate the weight ratio of halo-aluminate to silicon by the equation, $$\frac{11CaO \cdot 7Al_2O_3 \cdot CaX_2, \text{ percent}}{Si, \text{ percent}} = \frac{\beta_X}{R - \alpha_X}$$

where $\alpha_X$ is the intercept, and $\beta_X$ the slope, of the calibration curve determined for the compound sought. The values of the constants are given in the following table.

| Compound | X | $\beta_X$ | $\alpha_X$ |
|---|---|---|---|
| $12CaO \cdot 7Al_2O_3$ | ½O | 4.10 | 0.08 |
| $11CaO \cdot 7Al_2O_3 \cdot CaF_2$ | F | 3.85 | 0.158 |
| $11CaO \cdot 7Al_2O_3 \cdot CaCl_2$ | Cl | 2.78 | 0.219 |

In the foregoing examples calcium halo-aluminate is prepared essentially by reacting the appropriate calcium halide (e.g., calcium fluoride) with an alumina containing material in the absence of added steam. However, other halides such as the fluorosilicates or fluoroborates may be used. Accordingly, it is apparent that methods other than those previously outlined may be used for producing the $11CaO \cdot 7Al_2O_3 \cdot CaF_2$ compound or other ternary halide which is added to or formed directly in the portland cement for the purposes indicated.

While several embodiments of this invention are given above, it will be appreciated that other modifications may be made without departing from the spirit and scope of the invention as set forth in the following claims:

What is claimed is:

1. A modified portland cement composition capable of developing a high early set strength upon hydration consisting essentially of portland cement and between about 1 to 30 percent by weight of a calcium halo-aluminate having the formula $11CaO \cdot b0Al_2O_3 \cdot CaX_2$ in which X is a halogen.
2. The composition of claim 1 wherein the amount of said calcium halo-aluminate in said composition is between about 5 to 30 percent by weight.
3. The composition recited in claim 1 having added thereto between about 1 to 12 percent by weight calcium sulfate calculated as $SO_3$.
4. The composition recited in claim 1 in which X is fluorine.
5. The composition recited in claim 1 in which X is chlorine.
6. A process of preparing a modified portland cement composition characterized by its ability to develop a high early set strength upon hydration which comprises adding to a portland cement clinker a substantial amount halo-aluminate a calcium halo-aluminate having the formula $11CaO \cdot 7Al_2O_3 \cdot CaX_2$ in which X is halogen in an amount such that the percent of said calcium halo-aluminate in the resulting portland cement composition is between about 1 to 30 percent by weight.

7. A process of forming a modified portland cement composition characterized by its ability to develop a high early set strength upon hydration which comprises subjecting portland cement clinker raw mix including alumina to burning at between 1,275° and 1,400° C. in the absence of added steam but in the presence of calcium fluoride, the amounts of alumina in the raw mix and the calcium fluoride being sufficient to form in the resulting cement composition from about 1 to 30 percent by weight of a ternary compound having he formula $11CaO \cdot 7Al_2O_3 \cdot CaF_2$.

8. The process recited in claim 7 wherein the clinker resulting from the burning step is interground with calcium sulfate anhydrite and calcium or magnesium carbonate.

9. The process of claim 8 in which the relative proportions of the interground ingredients in the resulting product are such that the molar ratio of sulfate (calculated as $SO_3$) to alumina (calculated as $Al_2O_3$) is between about 0.6 and 1.0 and the molar ratio of carbonate (calculated as $CO_2$) to alumina (calculated as $Al_2O_3$) is between about 0.3 and 1.4.

10. The process of claim 7 wherein the alumina content of said raw mix is at least 0.5 percent by weight calculated as $Al_2O_3$.

11. A process of forming a modified portland cement composition characterized by its ability to develop a high early set strength upon hydration which comprises subjecting portland cement clinker raw mix including alumina to burning at between 1,380° to 1,510° C. in the absence of added steam but in the presence of calcium chloride, the amounts of alumina in the raw mix and the calcium chloride being sufficient to form in the resulting cement composition from about 1 to 30 percent by weight of a ternary compound having the formula $11CaO \cdot b0Al_2O_3 \cdot CaCl_2$.

12. The process of claim 11 wherein the alumina content of said raw mix is at least 0.5 percent by weight calculated as $Al_2O_3$.

* * * * *

UNITED STATES PATENT OFFICE
CERTIFICATE OF CORRECTION

Patent No. 3,628,973          Dated December 21, 1971

Inventor(s) Nathan R. Greening, Llewellyn E. Copeland and George J. Verbeck

It is certified that error appears in the above-identified patent and that said Letters Patent are hereby corrected as shown below:

Column 4, line 30, insert a parenthesis (() before "$Al_2O_3$)".

"    4, line 36, "$11CaO \cdot b0Al_2O_3 \cdot CaF_2$" should be
                          -- $11CaO \cdot 7Al_2O_3 \cdot CaF_2$ --;

"    4, line 45, "$12CaO \cdot b0Al_2O_3$" should be -- $12CaO \cdot 7Al_2O_3$ --;

"    4, line 62, "analysis" should be -- analyses --;

"    4, lines 63 and 66, "(1204K)" should be -- (I204K) --.

Column 5, line 7, "$(CaSO_4 \Phi \vee H_2O)$" should be -- $(CaSO_4 \cdot \frac{1}{2}H_2O)$ --;

"    5, line 8, "$11CaO \cdot b0Al_2O_3^{2}$" should be -
                          -- $11CaO \cdot 7Al_2O_3 \cdot CaF_2$ --.

Column 7, line 47, "25 days" should be -- 28 days --.

Column 8, line 7, after "weight" insert -- ratio --;

"    8, line 8, "$12CaO \cdot b0Al_2O_3$" should be -- $12CaO \cdot 7Al_2O_3$ --;

"    8, line 61, "$11CaO \cdot b0Al_2O_3 \cdot CaX_2$" should be
                         -- $11CaO \cdot 7Al_2O_3 \cdot CaX_2$ --;

"    8, line 73, after "amount" delete "halo-aluminate" and
                         insert -- of --

CERTIFICATE OF CORRECTION -- page 2

Patent No. 3,628,973   Dated December 21, 1971

Nathan R. Greening, Llewellyn E. Copeland and
   George J. Verbeck.

Column 10, line 15, "$11CaO \cdot b0al_2O_3 \cdot CaCl_2$" should be
-- $11CaO \cdot 7Al_2O_3 \cdot CaCl_2$ --.

Signed and sealed this 6th day of June 1972.

(SEAL)
Attest:

EDWARD M. FLETCHER, JR.
Attesting Officer

ROBERT GOTTSCHALK
Commissioner of Patents